United States Patent
Bangel et al.

(10) Patent No.: US 12,294,091 B2
(45) Date of Patent: May 6, 2025

(54) METHOD OF PROVIDING A CLEANED GAS DIFFUSION LAYER FOR ELECTROCHEMICAL APPLICATIONS

(71) Applicant: Greenerity GmbH, Alzenau (DE)

(72) Inventors: Dieter Bangel, Hüttenberg (DE); Sarayut Leeratanaphanit, Offenbach am Main (DE); Jens-Peter Suchsland, Alzenau (DE)

(73) Assignee: Greenerity GmbH, Alzenau (DE)

( * ) Notice: Subject to any disclaimer, the term of this patent is extended or adjusted under 35 U.S.C. 154(b) by 405 days.

(21) Appl. No.: 17/928,744

(22) PCT Filed: Jun. 9, 2021

(86) PCT No.: PCT/EP2021/065511
§ 371 (c)(1),
(2) Date: Nov. 30, 2022

(87) PCT Pub. No.: WO2021/250121
PCT Pub. Date: Dec. 16, 2021

(65) Prior Publication Data
US 2023/0231147 A1   Jul. 20, 2023

(30) Foreign Application Priority Data
Jun. 12, 2020   (DE) .................. 10 2020 115623.5

(51) Int. Cl.
*H01M 4/88* (2006.01)
(52) U.S. Cl.
CPC .................. *H01M 4/8807* (2013.01)
(58) Field of Classification Search
CPC .................................. H01M 4/8807
See application file for complete search history.

(56) References Cited

U.S. PATENT DOCUMENTS

2005/0255249 A1   11/2005   Schlatterbeck et al.
2016/0329591 A1   11/2016   Lee
(Continued)

FOREIGN PATENT DOCUMENTS

CN   111162301 A  *  5/2020  .............. C25B 1/04
CN   111169030 A  *  5/2020
(Continued)

OTHER PUBLICATIONS

Notification of Reasons for Rejection dated Oct. 3, 2023, of counterpart Japanese Patent Application No. 2022-576544, along with an English translation.
(Continued)

*Primary Examiner* — Brian R Ohara
(74) *Attorney, Agent, or Firm* — DLA Piper LLP (US)

(57) ABSTRACT

A method of providing a cleaned gas diffusion layer for electrochemical applications includes providing a gas diffusion layer such that a first side of the gas diffusion layer is arranged on a first vacuum conveyor belt, cleaning an exposed second side of the gas diffusion layer, the second side being situated opposite the first side of the gas diffusion layer, transferring the partially cleaned gas diffusion layer to a second vacuum conveyor belt partially situated opposite the first vacuum conveyor belt, wherein the first vacuum conveyor belt and the second vacuum conveyor belt have a transfer region in which the gas diffusion layer is transferred from the first vacuum conveyor belt to the second vacuum conveyor belt such that the first side of the gas diffusion layer is exposed, and cleaning the first side of the gas diffusion layer.

8 Claims, 2 Drawing Sheets

(56) References Cited

U.S. PATENT DOCUMENTS

| | | |
|---|---|---|
| 2019/0006682 A1 | 1/2019 | Okano et al. |
| 2019/0237788 A1* | 8/2019 | Bettey ................. H01M 4/8807 |
| 2019/0344405 A1 | 11/2019 | Mochizuki et al. |
| 2020/0070498 A1 | 3/2020 | Kawai |

FOREIGN PATENT DOCUMENTS

| | | |
|---|---|---|
| JP | 2010-070433 A | 4/2010 |
| JP | 2018-040099 A | 3/2018 |
| JP | 2020-037486 A | 3/2020 |
| KR | 10-2010-0107692 A | 10/2010 |

OTHER PUBLICATIONS

Notification of Reasons for Rejection dated Jun. 20, 2023, of counterpart Japanese Patent Application No. 2022-576544, along with an English translation.

International Search Report dated Sep. 21, 2021 in counterpart International Application No. PCT/EP2021/065511.

Written Opinion dated Sep. 21, 2021 in counterpart International Application No. PCT/EP2021/065511.

* cited by examiner

METHOD OF PROVIDING A CLEANED GAS DIFFUSION LAYER FOR ELECTROCHEMICAL APPLICATIONS

TECHNICAL FIELD

This disclosure relates to a method of providing a gas diffusion layer that has been cleaned from both sides for electrochemical applications.

BACKGROUND

Membrane electrode assemblies (MEA) for electrochemical applications, for example, fuel cells, water electrolysis cells, electrochemical compressors or electrochemical sensor applications, comprise not only a catalyst-coated membrane (CCM), which is composed of anode, cathode and a proton-conducting membrane, but also gas diffusion layers (GDL), the task of which is to first ensure good electrical contact between CCM and bipolar plates and, second, ensure good fuel transport to the anode, and good oxygen transport to the cathode. Furthermore, the gas diffusion layer has an influence on the water balance of the MEA. Gas diffusion layers are commonly constructed from a microporous layer (MPL) and a macroporous substrate material, with at least the macroporous substrate material comprising a fibrous material.

When cutting GDLs into the desired format, a breakaway of fibers can occur. Such fibers can lead to penetration of the CCM and thus to a chemical short circuit (gas transfer between anode and cathode) and to an electrical short circuit. Chemical and electrical short circuits lead to local generation of heat and thus damage the CCM that can result in a shortened service life or even a total failure.

It could therefore be helpful to provide a method of providing a gas diffusion layer having been cleaned from both sides for electrochemical applications, which method is simple and reliable and fully removes contamination, in particular with broken fibers, from the gas diffusion layer.

SUMMARY

We provide a method of providing a cleaned gas diffusion layer for electrochemical applications including providing a gas diffusion layer such that a first side of the gas diffusion layer is arranged on a first vacuum conveyor belt, cleaning an exposed second side of the gas diffusion layer, the second side being situated opposite the first side of the gas diffusion layer, transferring the partially cleaned gas diffusion layer to a second vacuum conveyor belt partially situated opposite the first vacuum conveyor belt, wherein the first vacuum conveyor belt and the second vacuum conveyor belt have a transfer region in which the gas diffusion layer is transferred from the first vacuum conveyor belt to the second vacuum conveyor belt such that the first side of the gas diffusion layer is exposed, and cleaning the first side of the gas diffusion layer.

LIST OF REFERENCE DESIGNATIONS

Figure 1:
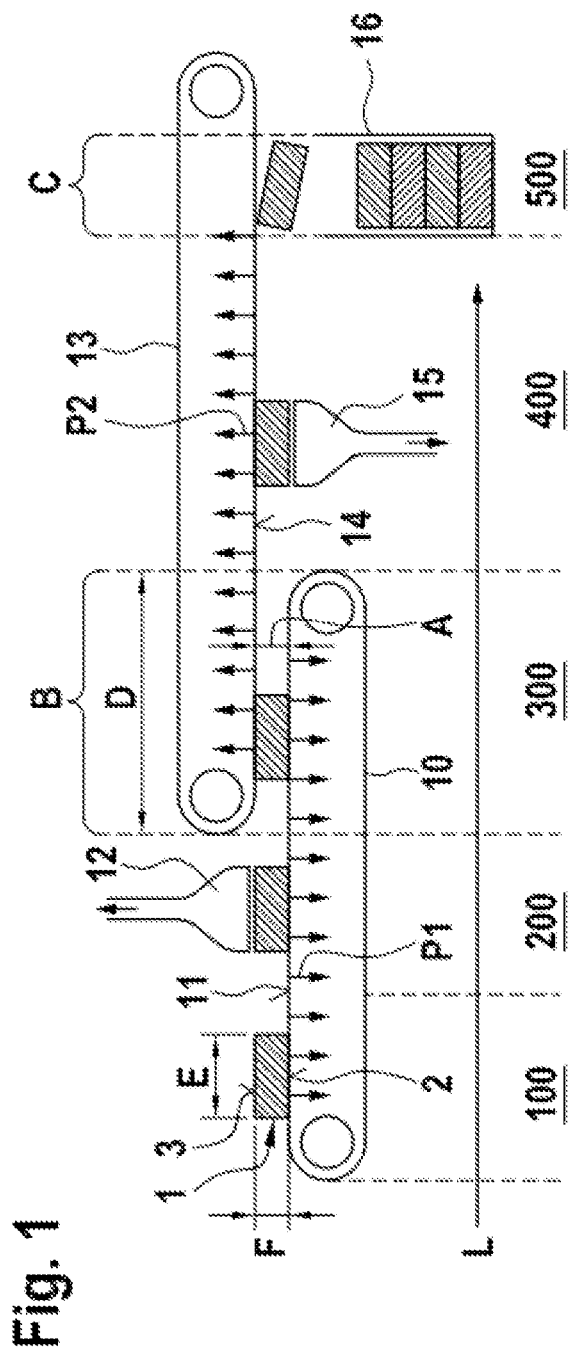
FIG. 1 illustrates a method of providing a cleaned gas diffusion layer for electrochemical applications according to a first example.

1 GDL
2 First side of the GDL
3 Second side of the GDL
10 First vacuum conveyor belt
11 Surface of the first vacuum conveyor belt
12 First cleaning device
13 Second vacuum conveyor belt
14 Surface of the second vacuum conveyor belt
15 Second cleaning device
16 Storage device
17 Conveyor belt
18 Surface of the conveyor belt
19 Storage device
20 Camera system
A Spacing of the first and second vacuum conveyor belts
B Transfer region
C Depositing region
D Length of the transfer region
E Length of the GDL
F Average thickness of the GDL
L Machine longitudinal direction

DETAILED DESCRIPTION

We provide a method of providing a cleaned gas diffusion layer for electrochemical applications, which method first comprises providing a gas diffusion layer. A gas diffusion layer (GDL) means an element that comprises, in particular, a microporous layer and a macroporous substrate material, wherein the average total thickness of the GDL preferably is 100 µm to 300 µm, and the substrate material is preferably of nonwoven type or paper type and comprises at least one fibrous material. The GDL is used in particular in fuel cells, water electrolysis cells, electrochemical compressors and electrochemical sensor applications.

The gas diffusion layer is provided such that a first side of the gas diffusion layer is arranged on a first vacuum conveyor belt. The GDL may, for example, be provided in sheet form, for example, manually or by a robot, from a storage device. The vacuum conveyor belt is substantially not limited and may be formed, for example, from a metallic material, an elastomer material or a polymer material, and in particular has holes via which the vacuum or a predefined negative pressure is applied to the GDL arranged on the first vacuum conveyor belt. The diameter of the holes may preferably be smaller than 4 mm, more preferably smaller than 2 mm and furthermore preferably smaller than 1 mm, and the number of holes per unit of area exhibits in particular a homogeneous distribution, or decreases from inside to outside.

The GDL that is arranged with the first side on the first vacuum conveyor belt has an oppositely situated exposed second side that is cleaned in a further method step. The GDL may lie on the first vacuum conveyor belt in a stationary manner, but is preferably transported onward along the first vacuum conveyor belt such that the cleaning can take place in a continuous process.

In particular, the GDL is transported on the first vacuum conveyor belt to a transfer region, at which the GDL arrives in a state in which the exposed second side of the GDL has been cleaned and in particular freed from broken-away fibers or fiber residues. The transfer region is a region in which the first vacuum conveyor belt and a second vacuum conveyor belt, which is partially situated opposite the first vacuum conveyor belt, have an overlap region in a conveying direction of the first vacuum conveyor belt. The GDL is thus transferred directly in a vertical direction from the first vacuum conveyor belt to the second vacuum conveyor belt.

In other words, the GDL is guided between the first vacuum conveyor belt and the second vacuum conveyor belt in the transfer region. In the transfer region, the partially cleaned GDL, that is to say the GDL whose second side has been cleaned, is transferred from the first vacuum conveyor belt to the second vacuum conveyor belt that is situated above or below the first vacuum conveyor belt, the transfer specifically taking place such that the first side of the gas diffusion layer is now exposed, and the cleaned second side of the GDL is in contact with the second vacuum conveyor belt. Until now, the first side of the GDL has been arranged on the first vacuum conveyor belt, but now, because of the GDL has been transferred to the second vacuum conveyor belt, the first side is exposed and is subsequently cleaned, for example, analogously to the second side. For this purpose, the GDL can be transported onward on the second vacuum conveyor belt.

The method makes it possible for a GDL to be cleaned from both sides in a continuous and very fast method implementation without the need for turning the GDL, and is thus particularly efficient and inexpensive. At the same time, the method allows safe and reliable handling of the GDL, whereby GDLs of particularly good quality, that is to say which have been reliably cleaned and have no damage, are obtained. Our method in particular allows the GDL to be transferred without the GDL being turned from one side to the other side or being turned over by a gripper, and is thus particularly gentle.

Advantageously, the GDLs for cleaning are provided as raw material gas diffusion layers in the form of roll stock that is singularized to form GDLs, for example, by cutting, punching and the like, before the cleaning operation. The singularized GDLs are then fed to the first vacuum conveyor belt. For the singularizing operation, the roll stock GDLs are preferably partially unrolled from the roll and then singularized to form GDLs. In particular, the cleaning is performed as a contactless cleaning operation, preferably in that, for the purposes of cleaning, an air stream is conducted to that side of the GDL which is to be cleaned, wherein the air stream is in particular ionized to more effectively remove possible electrostatically adherent contaminants from the surface for cleaning. The contaminants that are released in the air stream are furthermore preferably extracted by suction. In cleaning by an air stream, loose particles are thus actively detached from the surface, and the particles are in particular taken in and transported away by a suction-extraction device. Specifically contactless cleaning by an air stream allows particularly gentle cleaning of the GDL surface, and a suction-extraction device prevents a redistribution of particles. The GDL is thus cleaned in a highly efficient manner.

Further advantageously, the method provides extraction of contaminants by suction and/or removal of contaminants by an adhesive surface and/or removal of contaminants by electrostatic attraction. The former is referred to as contact cleaning, whereas the latter constitutes a further contactless cleaning operation.

To allow a safe and particularly reliable transfer of the GDL from the first vacuum conveyor belt to the second vacuum conveyor belt, it is advantageous for a length of the transfer region, in which the first vacuum conveyor belt and the second vacuum conveyor belt are situated opposite one another and thus overlap as viewed in a vertical direction, that is to say in other words a length of the overlap region, to be greater than or equal to the length of the gas diffusion layer in a machine longitudinal direction, that is to say in a conveying direction of the first vacuum conveyor belt. The length of the transfer region is in this example measured in a movement direction of the first vacuum conveyor belt from the start of the transfer region to the end of the transfer region.

In particular, to improve reliable and safe transport of the GDL on the first vacuum conveyor belt and on the second vacuum conveyor belt, the intensity of the vacuum (magnitude of the applied negative pressure) of the vacuum conveyor belts is set in a variable manner with regard to size, weight per unit of area, porosity and surface roughness, and with regard to the spacings or intermediate spaces between the individual GDLs in a conveying direction and in a machine transverse direction of the GDLs for cleaning such that the GDLs do not fall from the vacuum conveyor belts. The vacuum (or the negative pressure) of the first and the second vacuum conveyor belt is preferably −100 mbar to −900 mbar and preferably −300 mbar to −600 mbar.

Furthermore, the width of the vacuum may be set to the width of the GDL to avoid so-called leakage air and thus achieve good vacuum quality. For this purpose, the vacuum may also be deactivated in the outer regions of the first and of the second vacuum conveyor belt. This, too, improves the reliability with which the GDL is transported, in particular in the region of the second vacuum conveyor belt.

It is furthermore advantageous for the vacuum of the first vacuum conveyor belt and that of the second vacuum conveyor belt, that is to say the magnitudes of the respective negative pressures that are to be applied, to be settable independently of one another.

It is furthermore advantageous for the vacuum of the first vacuum conveyor belt to be controllable partially independently in the transfer region, and for a negative pressure that is set at the first vacuum conveyor belt in the transfer region to be smaller than the negative pressure of the second vacuum conveyor belt in the transfer region. This allows a particularly gentle transfer of the GDL from the first vacuum conveyor belt to the second vacuum conveyor belt, in particular without the GDL being bent or even damaged.

Furthermore, the vacuum of the first vacuum conveyor belt may be reduced in the transfer region in relation to the vacuum of the second vacuum conveyor belt. This advantageous configuration allows a particularly reliable transfer of the GDL from the first vacuum conveyor belt to the second vacuum conveyor belt, and prevents damage to the GDL during the transfer.

To allow particularly good cleaning of the GDL with simultaneously high throughput, the belt speed of the first and/or second vacuum conveyor belt advantageously is 0.1 m/min to 200 m/min, more preferably 0.1 m/min to 50 m/min, and even more preferably 0.5 m/min to 20 m/min. A superior combination of reliable cleaning and efficient, that is to say fast process implementation can be achieved by setting the belt speeds in the above-stated ranges.

Further advantageously, a belt speed set for the first vacuum conveyor belt is lower than the belt speed of the second vacuum conveyor belt. This prevents displacement or slippage of or damage to the GDL in the transfer region such as may occur if the belt speed of the second vacuum conveyor belt is somewhat slower than the belt speed of the first vacuum conveyor belt.

A spacing between the first vacuum conveyor belt and the second vacuum conveyor belt is advantageously settable, and is set to be greater than or equal to the average thickness of the GDL. At least a compression of the GDL, which can adversely affect functionality during later use, is thus first prevented, and a reliable transfer from the first vacuum conveyor belt to the second vacuum conveyor belt is second achieved. To allow exact setting of the spacing between the first vacuum conveyor belt and the second vacuum conveyor belt, very good plane parallelism between the first vacuum conveyor belt and the second vacuum conveyor belt is advantageous. If the average thickness of the GDL is normally 100 µm to 300 µm, an alignment of the first and second vacuum conveyor belts such that a deviation from plane parallelism between the first vacuum conveyor belt and the second vacuum conveyor belt is less than 10 µm is particularly advantageous such that the GDL is not damaged during the method, and to allow safe and reliable transport.

The method may furthermore advantageously provide a step of analyzing the cleaned GDL using a camera system. Images of faults such as fibers, scratches, cracks, fractures and the like may be stored in the camera system and recognized by the camera system. In accordance with the quality of the GDL, so-called good parts can be separated and stored for further processing. So-called bad parts can be sorted out and separated.

The cleaned gas diffusion layer is preferably transferred into a storage device.

In particular, GDLs of good quality (good parts) are transferred by the second vacuum conveyor belt into a first storage device, and any reject parts (bad parts) are transferred into a second storage device.

It is furthermore advantageous for the cleaned GDL to be transferred from the second vacuum conveyor belt to a further conveyor belt, and transferred from the further conveyor belt into a storage device, optionally additionally by using a gripper device. This allows particularly the cleaned GDL to be stored particularly effectively and quickly, without the cleaning process at the first and second vacuum conveyor belts being influenced.

Further details, advantages and features of our method will emerge from the following description of examples on the basis of the drawings.

The figures illustrate only the features essential to our method. All other features have been omitted for the sake of clarity. Furthermore, the same reference designations are used to denote identical parts.

In detail, FIG. 1 illustrates method steps of providing a cleaned gas diffusion layer for electrochemical applications.

First, a GDL 1 is provided in the method step 100. The GDL has a first side 2 and a second side 3 situated opposite the first side 2. The GDL 1 is provided such that the first side 2 of the GDL 1 is arranged on a first vacuum conveyor belt 10, and then in contact with a surface 11 of the first vacuum conveyor belt 10. By contrast, the second side 3, which is situated opposite the first side 2 of the GDL 1, is exposed.

The GDL 1 is prevented from falling from the first vacuum conveyor belt 10, and safe transport of the GDL 1 on the first vacuum conveyor belt 10 is thus also ensured, by virtue of the GDL 1 being suctioned with its first side 2 onto the surface 11 of the first vacuum conveyor belt 10 by negative pressure, as illustrated by the arrows P1. The GDL 1 is transported in a machine longitudinal direction L, that is to say the conveying direction of the first vacuum conveyor belt 10, on the surface 11 of the first vacuum conveyor belt 10 to a first cleaning device 12, where cleaning 200 of the second side 3 of the GDL 1, for example, by contactless cleaning by an air stream with or without ionization, and optional subsequent extraction of contaminated air by suction, is performed.

The GDL 1 is transported onward on the surface 11 of the first vacuum conveyor belt 10 to a transfer region B. In the transfer region B, the partially cleaned GDL 1 is transferred 300 to a second vacuum conveyor belt 13, which is partially situated opposite the first vacuum conveyor belt 10. The transfer region B corresponds to a region of overlap in a machine longitudinal direction L of the first and of the second vacuum conveyor belt 10, 13. The GDL 1 is transferred such that the first side 2 of the GDL 1 is now exposed, and the second side 3, which has already been cleaned, of the GDL 1 comes into contact with a surface 14 of the second vacuum conveyor belt 13, and is suctioned onto the surface 14 by negative pressure, as illustrated by the arrows P2.

The GDL 1 is then transported onward on the second vacuum conveyor belt 13 in a machine longitudinal direction L to a second cleaning device 15, which may be configured similarly to the first cleaning device 12. Cleaning 400 of the exposed first side 2 of the GDL 1 is performed. The GDL 1 is transported onward to a depositing region C, in which the GDL 1 is transferred into a storage device 16 and stored in method step 500. This is possible very easily in particular if, in the depositing region C, the negative pressure at the second vacuum conveyor belt 13 is reduced to such an extent that the GDL 1 passes of its own accord into the storage device 16.

The negative pressure of the first vacuum conveyor belt 10 and that of the second vacuum conveyor belt 13 are, for the implementation of the method, preferably settable independently of one another, and also settable partially variably within a vacuum conveyor belt 10, 13. In particular, the vacuum (that is to say the negative pressure) of the first and of the second vacuum conveyor belt 10, 13 is set to −100 mbar to −900 mbar, and preferably −300 mbar to −600 mbar, wherein the vacuum of the first vacuum conveyor belt 10 is controllable partially independently in the transfer region B, and a negative pressure set in the transfer region B is lower than the negative pressure of the second vacuum conveyor belt 13 in the transfer region B. In this way, the GDL 1 is transferred from the first vacuum conveyor belt 10 to the second vacuum conveyor belt 13 particularly easily and safely, without damage being caused to the GDL 1.

As can also be seen from FIG. 1, the length D of the transfer region B in which the first vacuum conveyor belt 10 and the second vacuum conveyor belt 13 are situated opposite one another (overlap region) is greater than the length E of the GDL 1, each as viewed in a conveying direction of the first vacuum conveyor belt 10 (machine longitudinal direction L). This likewise allows very safe and destruction-free transfer of the GDL 1 from the first vacuum conveyor belt 10 to the second vacuum conveyor belt 13.

The belt speed of the first and/or second vacuum conveyor belt 10, 13 furthermore in particular is 0.1 m/min to 200 m/min, more preferably 0.1 m/min to 50 m/min, and even more preferably 0.5 m/min to 20 m/min, wherein the first vacuum conveyor belt 10 preferably has a lower belt speed than the second vacuum conveyor belt 13 to allow a smooth process without the GDLs 1 becoming backed up.

To furthermore prevent damage to the GDL 1 as a result of compression, and at the same time promote effective and safe transport of the GDL 1 on the vacuum conveyor belts 10, 13 and a superior transfer in the transfer region B, a spacing A between the first vacuum conveyor belt 10 and the second vacuum conveyor belt 13 is set to be greater than or equal to the average thickness F of the GDL 1.

The method illustrated in FIG. 1 allows the GDL 1 to be cleaned from both sides 2, 3 in a continuous and very fast method implementation, without the GDL 1 being turned or damaged. In particular, because no turning of the GDL 1 or movement of the GDL 1 using a gripper is performed during the transfer of the GDL 1 from the first vacuum conveyor belt 10 to the second vacuum conveyor belt 13, the method implementation shown here is particularly gentle. Therefore, the method is particularly efficient, inexpensive and light on resources. At the same time, the method allows safe and reliable handling of the GDL 1, whereby GDLs 1 of particularly good quality, that is to say which have been reliably cleaned and have no damage, are obtained.

Figure 2:
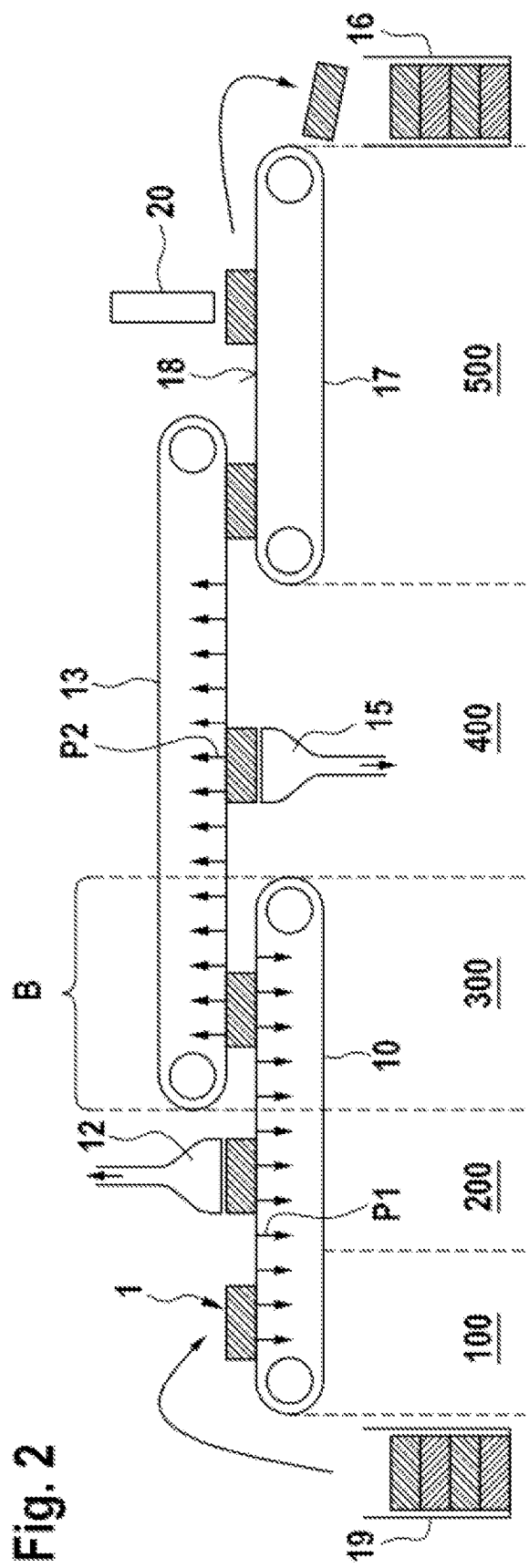
FIG. 2 illustrates a method of providing a cleaned gas diffusion layer for electrochemical applications according to a second example.

In detail, FIG. 2 illustrates method steps of providing a cleaned gas diffusion layer for electrochemical applications, according to a second example. By contrast to the method illustrated by FIG. 1, FIG. 2 additionally shows that the GDLs 1 are, to be provided, taken from a further storage device 19. The method steps of the transporting and cleaning 200 of the second side 2 of the GDL 1 by the first cleaning device 12 on the first vacuum conveyor belt 10, the transfer 300 to the second vacuum conveyor belt 13 in the transfer region B, and the cleaning 400 of the first side 3 of the GDL 1 by the second cleaning device 15 at the second vacuum conveyor belt 13, correspond to those from FIG. 1.

As a further difference, however, an additional conveyor belt 17 is provided. The conveyor belt 17 may, though need not, be configured as a vacuum conveyor belt. It serves merely for conveying the fully cleaned GDL 1 on the surface 18 of the conveyor belt 17 from the second vacuum conveyor belt 13 to the storage device 16. This method implementation is particularly advantageous if a camera system 20 is provided, by which any defects in the GDL 1 can be identified such that the storage 500 may also be performed in different storage devices 16, for example, with good parts being stored in a first storage device and bad parts being stored in a second storage device.

The same advantages as for the method implementation presented in FIG. 1 are achieved.

In addition to the written description above, reference is hereby explicitly made, for supplementary disclosure thereof, to the illustrations in FIGS. 1 and 2 of the drawings.

The invention claimed is:

1. A method of providing a cleaned gas diffusion layer for electrochemical applications comprising:
    providing a gas diffusion layer such that a first side of the gas diffusion layer is arranged on a first vacuum conveyor belt,
    cleaning an exposed second side of the gas diffusion layer, said second side being situated opposite the first side of the gas diffusion layer,
    transferring the partially cleaned gas diffusion layer to a second vacuum conveyor belt partially situated opposite the first vacuum conveyor belt, wherein the first vacuum conveyor belt and the second vacuum conveyor belt have a transfer region in which the gas diffusion layer is transferred from the first vacuum conveyor belt to the second vacuum conveyor belt such that the first side of the gas diffusion layer is exposed, and
    cleaning the first side of the gas diffusion layer.

2. The method as claimed in claim 1, wherein raw material gas diffusion layers are provided as roll stock singularized to form gas diffusion layers.

3. The method as claimed in claim 1, wherein, for purposes of cleaning, an air stream is conducted to that side of the gas diffusion layer which is to be cleaned, and is also extracted by suction.

4. The method as claimed in claim 1, further comprising extraction of contaminants by suction and/or removal of contaminants by an adhesive surface and/or removal of contaminants by electrostatic attraction.

5. The method as claimed in claim 1, wherein
    a length of the transfer region is greater than or equal to a length of the gas diffusion layer, and/or
    the vacuum of the first vacuum conveyor belt and of the second vacuum conveyor belt is −100 mbar to −900 mbar, and/or
    the vacuum of the first vacuum conveyor belt and that of the second vacuum conveyor belt are settable independently of one another, and/or
    the vacuum of the first vacuum conveyor belt is controllable partially independently in the transfer region, and a negative pressure set in the transfer region is smaller than the negative pressure of the second vacuum conveyor belt in the transfer region, and/or
    the belt speed of the first and/or second vacuum conveyor belt is 0.1 m/min to 200 m/min, and/or
    the first vacuum conveyor belt has a lower belt speed than the second vacuum conveyor belt.

6. The method as claimed in claim 1, wherein a spacing between the first vacuum conveyor belt and the second vacuum conveyor belt is settable, and is set to be greater than or equal to an average thickness of the GDL.

7. The method as claimed in claim 1, further comprising analyzing the cleaned gas diffusion layer with a camera system.

8. The method as claimed in claim 1, wherein the cleaned gas diffusion layer is transferred into a storage device, and/or the cleaned gas diffusion layer is transferred from the second vacuum conveyor belt to a conveyor belt, and is transferred from the conveyor belt into a storage device.

* * * * *